United States Patent [19]
Takeuchi et al.

[11] Patent Number: 6,166,524
[45] Date of Patent: Dec. 26, 2000

[54] ALTERNATE FUEL GAUGE FOR AN ALKALI METAL ELECTROCHEMICAL CELL

[75] Inventors: Esther S. Takeuchi, East Amherst; Noelle M. Waite, Clarence Center; Kenneth C. Syracuse, Williamsville, all of N.Y.

[73] Assignee: Wilson Greatbatch Ltd., Clarence, N.Y.

[21] Appl. No.: 09/521,309

[22] Filed: Mar. 9, 2000

[51] Int. Cl.[7] .......................... H01M 10/44; H01M 10/46

[52] U.S. Cl. ........................................... 320/132; 320/161

[58] Field of Search ..................................... 320/129, 132, 320/135, 139, 161; 324/426, 427, 433

[56] References Cited

U.S. PATENT DOCUMENTS

| | | | |
|---|---|---|---|
| 4,556,061 | 12/1985 | Barreras et al. | 128/419 |
| 4,607,932 | 8/1986 | Egawa et al. | 354/468 |
| 5,144,218 | 9/1992 | Bosscha | 320/44 |
| 5,284,719 | 2/1994 | Landau et al. | 429/50 |
| 5,357,203 | 10/1994 | Landau et al. | 324/427 |

*Primary Examiner*—Edward H. Tso
*Attorney, Agent, or Firm*—Hodgson Russ Andrews Woods & Goodyear LLP

[57] ABSTRACT

A "fuel gauge" for a pulse dischargeable alkali metal/solid cathode cell is described. The rate of voltage recovery is used to determine the state of charge of the cell. Voltage recovery includes recovery from one load to a second, lighter load, or a loaded condition to OCV. The present invention is particularly useful as an end-of-life indicator for a $Li/CF_x$ cell powering an implantable medical device.

29 Claims, 5 Drawing Sheets

ALTERNATE FUEL GAUGE FOR AN ALKALI METAL ELECTROCHEMICAL CELL

BACKGROUND OF THE INVENTION

1. Field of the Invention

The present invention generally relates to the conversion of chemical energy to electrical energy. More particularly, the present invention relates to the use of data collected from a discharging alkali metal/solid cathode cell to provide a "fuel gauge" for determining the state of charge of the cell. According to the present invention, the use of voltage recovery data from one load to a second, lighter load in a pulse discharging cell, particularly a Li/CF$_x$ cell, is used to estimate the depth-of-discharge (DOD) for the cell. The depth-of-discharge is directly related to the remaining discharge capacity. The use of the pulse discharge data as a fuel gauge according to the present invention is, therefore, particularly useful in an electrochemical cell powering an implantable medical device where the cell may discharge under a light load for extended periods of time interrupted by pulse discharge.

2. Prior Art

In a discharging electrochemical cell, especially an implantable cell, it is desirable to know the amount or quantity of available capacity that remains. This affords the physician an opportunity to schedule surgery for device replacement in a timely and orderly manner without causing undue or unnecessary harm to the patient. Up to now, attempts to determine the charge condition or consumed battery capacity in a pulse dischargeable cell have generally relied on a counter to tabulate the number of pulses delivered by the battery, and hence, the remaining capacity. Representative of these types of devices are U.S. Pat. Nos. 4,556,061 to Barreras et al. and 5,144,218 to Bosscha.

The present invention is not dependent on a raw or cumulative pulse count, but rather, the recovery rate from one load to a second, lighter load or to open circuit voltage (OCV) to determine the depth of discharge for the cell.

SUMMARY OF THE INVENTION

According to the present invention, the voltage recovery data from one load to a second, lighter load in a pulse discharging cell, particularly a Li/CF$_x$ cell, are used to calculate the depth-of-discharge (DOD) for the cell. In that respect, voltage recovery according to the present invention is determined from one load to a second, lighter load or from a loaded condition to open circuit voltage. Such load variations can occur in an implantable medical device wherein the cell may discharge for extended periods under a light load interrupted by pulse discharge.

The foregoing and additional advantages and characterizing features of the present invention will become clearly apparent upon a reading of the following detailed description together with the included drawings.

DETAILED DESCRIPTION OF THE INVENTION

As used herein, the term "pulse" means a short burst of electrical current of a greater amplitude than that of a current immediately prior to the pulse. A pulse train consists of at least two pulses of electrical current delivered in relatively short succession with or without open circuit rest between the pulses.

Figure 1:
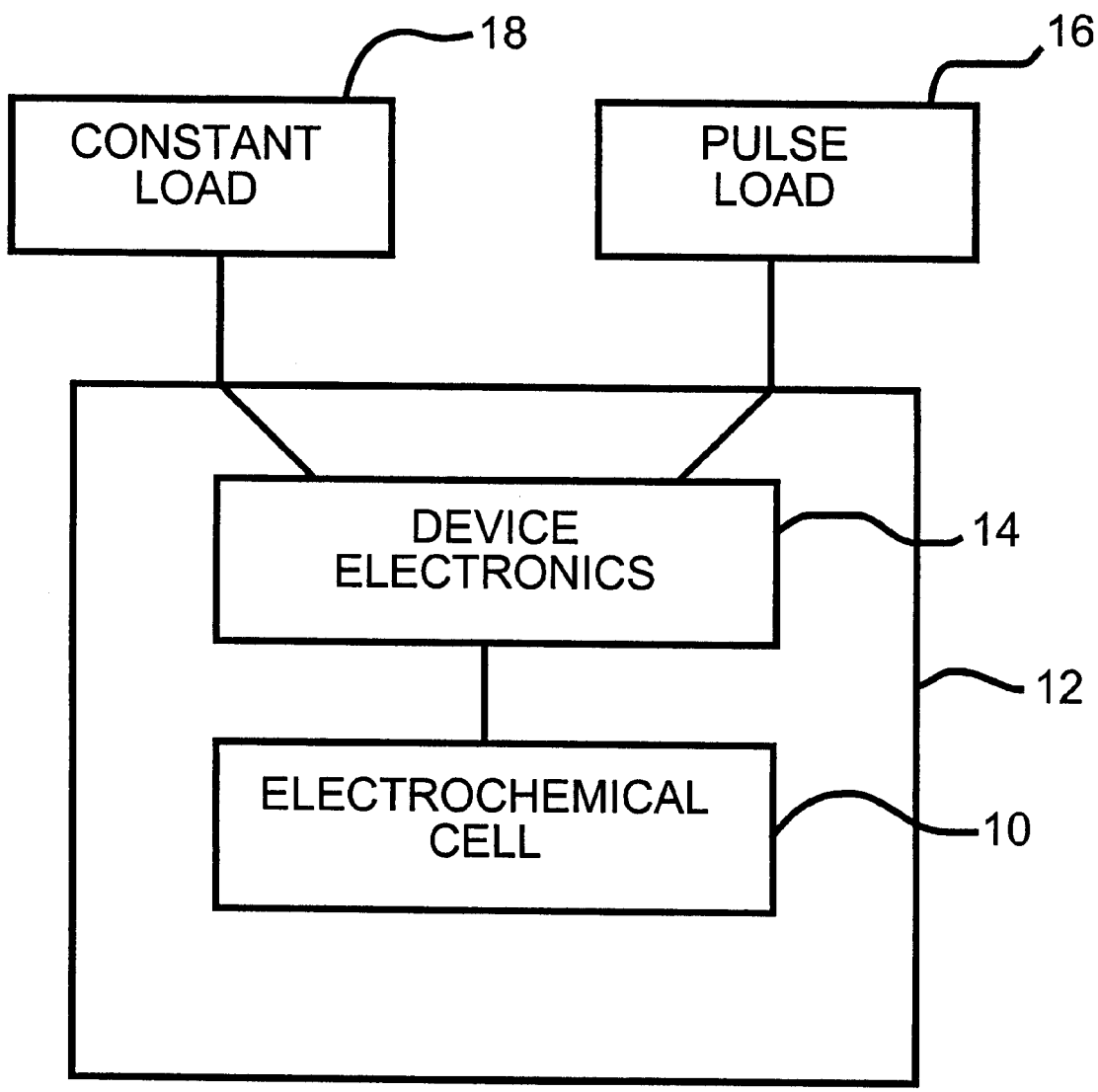
FIG. 1 is a schematic of an implantable medical device useful with the fuel gauge of the present invention.

Referring now to the drawings, FIG. 1 shows a schematic embodiment of an electrochemical cell 10 according to the present invention provided as the power source for an implantable medical device 12. Representative medical devices include drug pumps, pacemakers, arterial defibrillators and neurostimulators, and the like. The cell 10 is connected to electronic circuitry 14 for the medical device 12. The electronics 14 enable the cell 10 to power the medical device 12 both at a relatively constant load 16 in a device monitoring mode, for example in a cardiac pacemaker for monitoring the heartbeat, and at a pulse load 18 during a device operating mode for charging a capacitor (not shown) or for delivering therapy.

An electrochemical cell that possesses sufficient energy density and discharge capacity required of implantable medical devices comprises an anode of anode active materials selected from Groups IA, IIA and IIIA of the Periodic Table of the Elements, including lithium, sodium, potassium, calcium, magnesium or their alloys, or any alkali metal or alkali-earth metal capable of functioning as an anode. Lithium is preferred and in that case the alloys and intermetallic compounds include, for example, Li—Si, Li—Al, Li—Mg, Li—Al—Mg, Li—B and Li—Si—B alloys and intermetallic compounds. The form of the anode may vary, but typically, the anode comprises a thin sheet or foil of the anode metal or alloy thereof, and a current collector contacted to the anode material. The current collector includes an extended tab or lead for connection to the negative terminal.

The cathode electrode comprises solid active materials such as are typically used in alkali metal/solid cathode electrochemical cells. Particularly preferred cathode active materials for use with the present invention are prepared from fluorine and carbon including graphitic and nongraphitic forms of carbon, such as coke, charcoal or activated carbon. The fluorinated carbon is represented by the formula (CF$_x$)$_n$ wherein x varies between about 0.1 to 1.9 and preferably between about 0.5 and 1.2, and (C$_2$F)$_n$ wherein the n refers to the number of monomer units which can vary widely.

Other electrode active materials suitable for use with the present invention include a metal, a metal oxide, a metal sulfide and carbonaceous materials, and mixtures thereof. Such electrode active materials include, but are not limited to, manganese dioxide, copper silver vanadium oxide, silver vanadium oxide, copper vanadium oxide, titanium disulfide, copper oxide, copper sulfide, iron sulfide, iron disulfide and carbon, and mixtures thereof. No matter what active material is used, the cathode preferably comprises about 80 to about 99 weight percent of the electrode active material.

According to the present invention, the preferred cathode active mixture comprises CF$_x$ combined with a discharge promoter component such as acetylene black, carbon black and/or graphite. Metallic conductive diluents such as nickel, aluminum, titanium and stainless steel in powder form are also useful when mixed with the cathode active mixture of the present invention. Up to about 10 weight percent of the discharge promoter component/conductive diluent is added to the mixture to improve conductivity.

Solid cathode active components for incorporation into a cell according to the present invention may be prepared by rolling, spreading or pressing a mixture of one or more of the above listed electrode active materials, a discharge promoter component and/or one or more of the enumerated conductive diluents onto a cathode current collector with the aid of a binder material. Preferred binder materials include a powdered fluoro-resin such as powdered polytetrafluoroethylene (PTFE) or powdered polyvinylidene fluoride present at about 1 to about 5 weight percent of the electrode active material.

The cathode current collector includes a lead for connection to the positive cell terminal, and is preferably in the form of a thin sheet or metal screen, for example, a titanium, stainless steel, aluminum or nickel screen, preferably titanium, having the lead extending therefrom. Alternatively, prior to contact with the current collector, the cathode active mixture including the binder and the discharge promoter component/conductive diluent is formed into a free-standing sheet in a manner similar to that described in U.S. Pat. No. 5,543,249 to Takeuchi et al., which is assigned to the assignee of the present invention and incorporated herein by reference.

Cathodes prepared as described above may be in the form of a strip wound with a corresponding strip of anode material in a structure similar to a "jellyroll", or in the form of one or more plates operatively associated with at least one or more plates of anode material as in a prismatic configuration. Electrode assemblies having a bobbin shape, a button configuration and the like are also useful with the present invention.

The electrochemical cell of the present invention further includes a separator disposed intermediate the Group IA, IIA and IIIA anode and the cathode to provide physical separation therebetween. The separator is of electrically insulative material and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the electrochemical cell. Illustrative separator materials include woven and non-woven fabrics of polyolefinic fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and ceramic materials. Suitable microporous films include a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic or organic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent or, a single solvent. The ionically conductive salt serves as the vehicle for migration of the anode ions to intercalate or react with the cathode active material. In a solid cathode/electrolyte system, the preferred ion-forming alkali metal salt is similar to the alkali metal comprising the anode. Examples of salts useful with the present invention include $LiPF_6$, $LiAsF_6$, $LiSbF_6$, $LiBF_4$, $LiAlC_4$, $LiO_2$, $LiGaCl_4$, $LiSO_3F$, $LiB(C_6H_5)_4$, $LiClO_4$, $LiC(SO_2CF_3)_3$, $LiSCN$, $LiO_3SCF_2CF_3$, $LiC_6F_5SO_3$, $LiO_2CCF_3$, $LiN(SO_2CF_3)_2$ and $LiCF_3SO_3$, and mixtures thereof.

Low viscosity solvents include tetrahydrofuran (TFH), methyl acetate (MA), diglyme, trigylme, tetragylme, dimethyl carbonate (DMC), 1,2-dimethoxyethane (DME), diethyl carbonate, diisopropylether, 1,2-diethoxyethane (DEE), 1-ethoxy, 2-methoxyethane (EME), dipropyl carbonate (DPC), ethyl methyl carbonate (EMC), methyl propyl carbonate (MPC) and ethyl propyl carbonate (EPC), and mixtures thereof, and high permittivity solvents include cyclic carbonates, cyclic esters and cyclic amides such as propylene carbonate (PC), butylene carbonate (BC), ethylene carbonate (EC), acetonitrile, dimethyl sulfoxide, dimethyl formamide, dimethyl acetamide, γ-valerolactone, γ-butyrolactone (GBL) and N-methylpyrrolidinone (NMP) and mixtures thereof. In the preferred electrochemical cell comprising the $Li/CF_x$ couple, the preferred electrolyte is 1.0M to 1.4M $LiBF_4$ in γ-butyrolactone (GBL).

The preferred form of the electrochemical cell of the present invention is a case-negative design wherein the anode/cathode couple is provided in a prismatic configuration inserted into a conductive metal casing such that the casing, a header thereof, or both are connected to the anode current collector and serve as the negative cell terminal, as is well known to those skilled in the art. A preferred material for the casing is titanium although stainless steel, nickel and aluminum are suitable. The casing header has a sufficient number of openings to accommodate a glass-to-metal seal terminal pin feedthrough for the cathode electrode. An additional opening is provided for electrolyte filling. After the prismatic electrode assembly is inserted into the casing and the casing header is secured thereto, the cell is filled with the electrolyte solution described hereinabove and hermetically sealed such as by close-welding a stainless steel plug over the fill hole, but not limited thereto. The cell of the present invention can also be constructed in a case-positive design.

The following example describes the manner and process of manufacturing an electrochemical cell according to the present invention, and it sets forth the best mode contemplated by the inventors of carrying out the invention, but it is not to be construed as limiting.

EXAMPLE I

To closely mimic the conditions present in an implantable medical device, a test was conducted to estimate the depth of discharge for a $Li/CF_x$ cell where the total of pulse length and recovery interval (combined) was less than 0.83 seconds (corresponding to 72 beats per minute). The present example considers 0.50 seconds and 0.68 seconds recovery times.

Twenty lithium/carbon monofluoride ($Li/CF_x$) cells commercially available under model no. 9424 from Wilson Greatbatch Ltd., Clarence, N.Y., the assignee of the present invention, were selected from production inventory for pulse discharge testing. These cells have a half-round profile with external dimensions of 45 mm×22 mm×5 mm and a theoretical capacity of 1.32 Ah. The selected Li/CF$_x$ cells are fabricated for use in implantable medical applications and they are capable of providing currents in the microamp to milliamp range while offering high energy density, long shelf life, and low impedance throughout cell life. The Li/CF$_x$ couple is characterized by a relatively flat voltage discharge profile.

First, the cells were discharged at 37° C. for 9 hours under a 1.5 kohm constant resistance load during an initial predischarge period. The predischarge period depleted the cells of approximately 1% of their theoretical capacity. Following this constant resistance portion of the regime, the cells were placed on open circuit storage for one week at 37° C., after which time the cells were subjected to a 10 mA pulse train. This pulse train consisted of four, 10 second pulses, with 15 second rest intervals between pulses.

Next, 100 kohm loads were soldered to each of the cells. All twenty cells were then pulse discharged at 37° C. according to the following regime:

1) Pulse train 1 was applied to the cells immediately (one cell at a time) under the 100 kohm background load. Subsequent pulse trains were applied every 0.06 Ah.
2) As presented in Table 1, each pulse train consisted of 9 pulses applied in parallel with the 100 kohm load that had been soldered to the cells. However, the maximum contribution of the 100 kohm load was calculated to be approximately 28 microamps. Therefore, the stated pulse amplitudes do not account for the 100 kohm load.

TABLE 1

| Pulse # | Pulse Length (sec) | Pulse Amplitude (mA) |
|---|---|---|
| 1 | 0.02 | 0.5 |
| 2 | 0.02 | 5 |
| 3 | 0.02 | 20 |
| 4 | 0.2 | 0.5 |
| 5 | 0.2 | 5 |
| 6 | 0.2 | 20 |
| 7 | 2 | 0.5 |
| 8 | 2 | 5 |
| 9 | 2 | 20 |

3) An additional 5 kohm background load was applied between pulse trains in order to accelerate discharge. This load was removed for each pulse train application, starting with train 2. The actual drain experienced by the cells as a result of the 5 kohm load between pulse trains was approximately 4.76 kohms because the 5 kohm load was applied in parallel with the 100 kohm load previously soldered to the cells.
4) As soon as one of the cells delivered 0.06 Ah under background load since the end of the previous pulse train, the 5 kohm load was removed from all of the cells simultaneously, then all of the cells received one pulse train 24 hours later (i.e., the cells were pulsed one at a time following a 24-hour recovery period under 100 kohm background load), then the 5 kohm load was reapplied to all of the cells until the next pulse train.
5) The time between pulses within a train was 5 minutes (typical).
6) The end-of-life (EOL) cutoff was 1.0V under 5 mA pulse.

The cells reached end-of-life during pulse trains 22 or 23.

Figure 2:
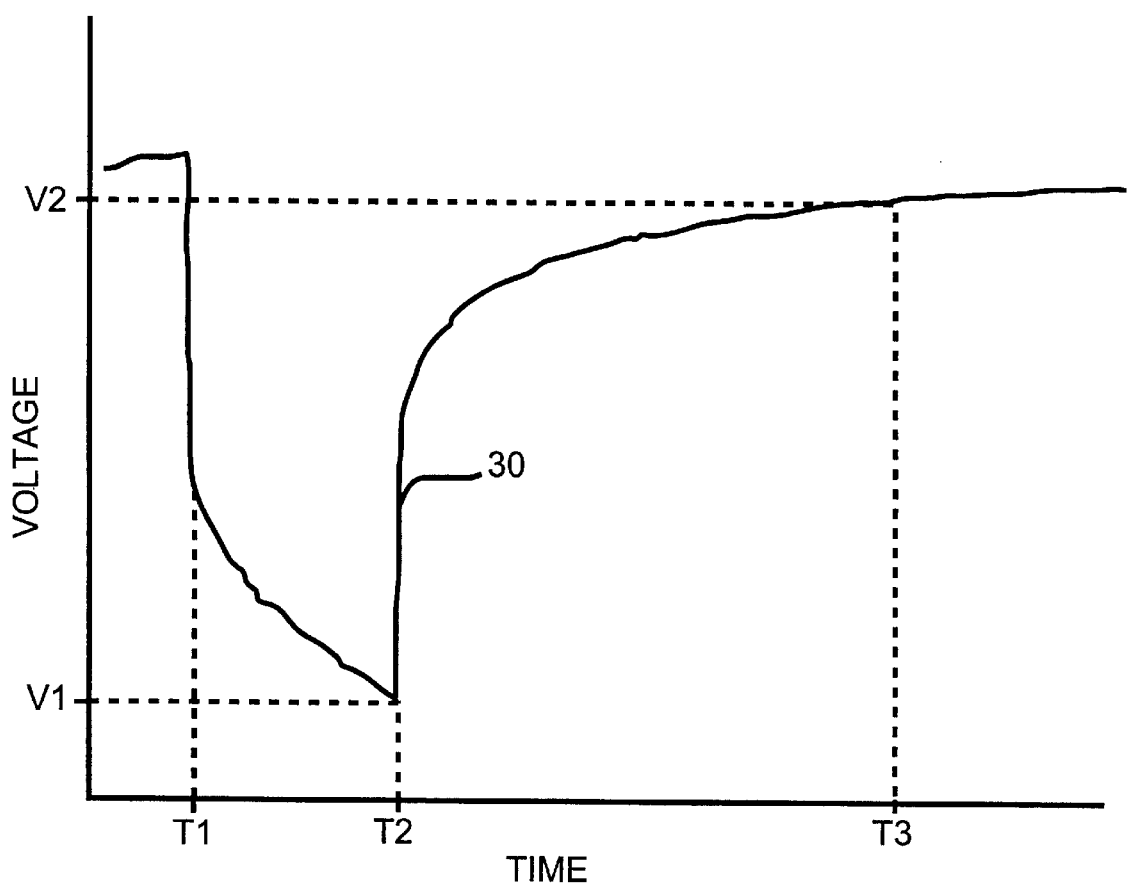
FIG. 2 is a graph showing the typical pulse signature of a Li/CF$_x$ cell.

FIG. 2 is a graph showing the typical pulse signature of a Li/CF$_x$ cell (curve 30) wherein the pulse length is equal to (T2−T1) and recovery time is equal to (T3−T2). Voltage change is equal to (V2−V1). In this example, pulse application and voltage recovery [(T2−T1) plus (T3−T2)] were required to be within a total of 0.83 seconds (corresponding to 72 heartbeats per minute). FIGS. 3 to 8 are graphs showing the value of $\Delta V/\Delta T=(V2-V1)/(T3-T2)$ as a function of DOD for the three pulse amplitudes set forth in Table 1.

Figure 3:
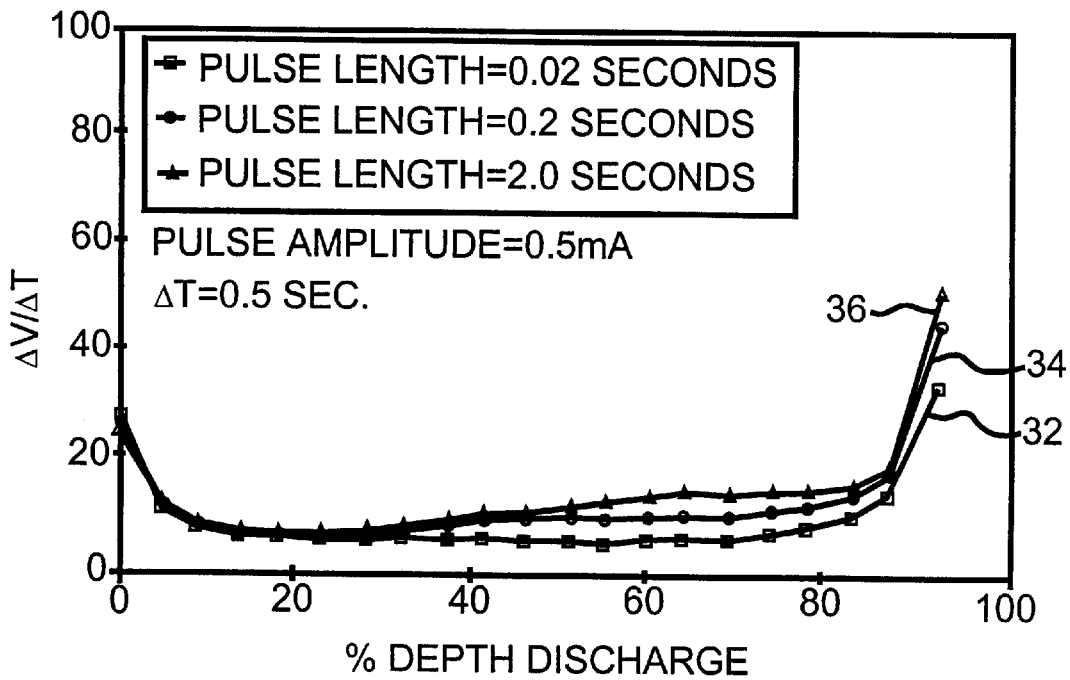
FIGS. 3 to 8 are graphs constructed from the ΔV/ΔT ratio versus % depth-of-discharge for Li/CF$_x$ cells under various discharge regimens.

In FIG. 3, all of the curves were constructed from voltage recovery under a 0.5 mA pulse, 0.5 seconds after pulse completion wherein curve 32 was constructed from the 0.02 seconds pulse length, curve 34 was constructed from the 0.2 seconds pulse length and curve 36 was constructed from the 2.0 seconds pulse length.

Figure 4:
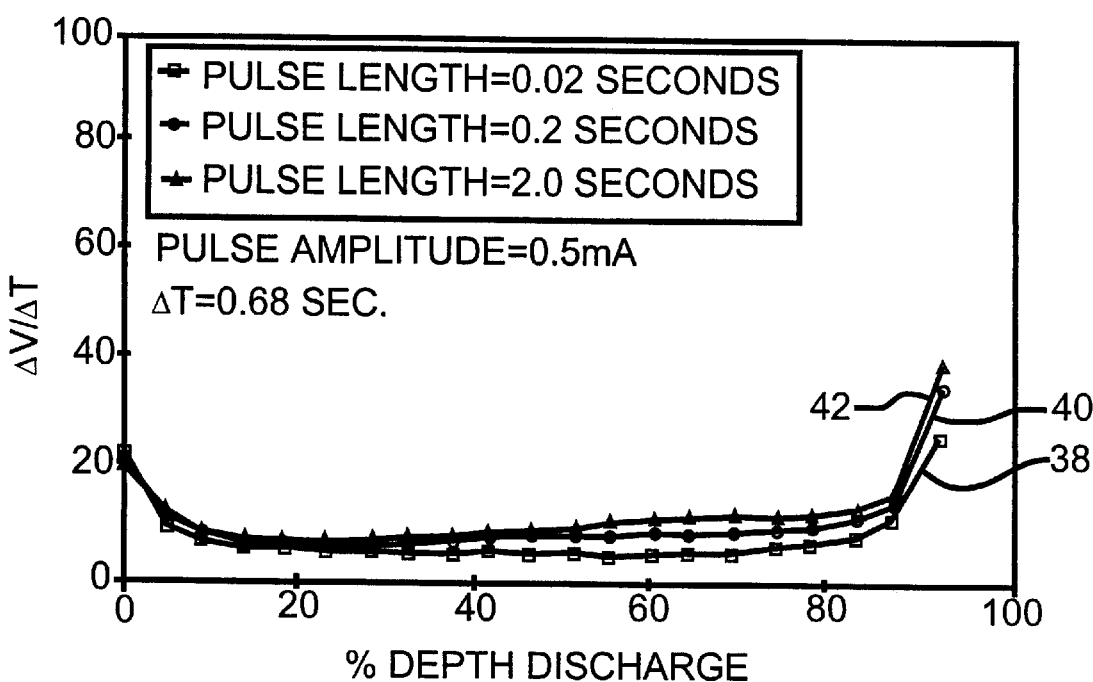

In FIG. 4, all of the curves were constructed from voltage recovery under a 0.5 mA pulse, 0.68 seconds after pulse completion wherein curve 38 was constructed from the 0.02 seconds pulse length, curve 40 was constructed from the 0.2 seconds pulse length and curve 42 was constructed from the 2.0 seconds pulse length.

Figure 5:
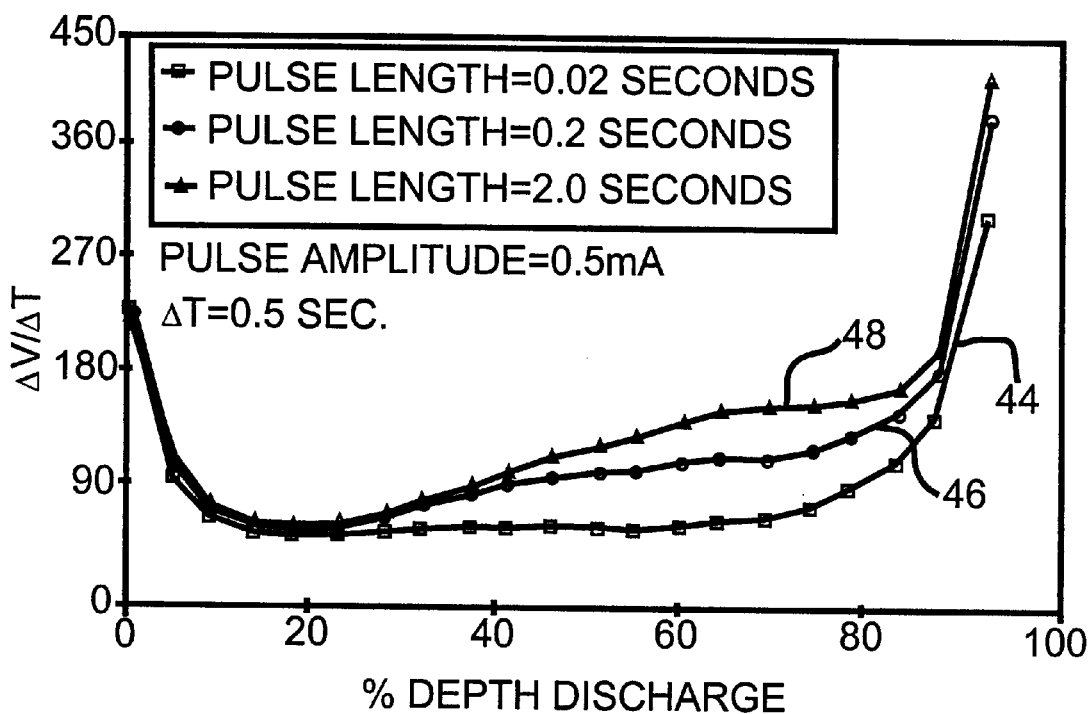

In FIG. 5, all of the curves were constructed from voltage recovery under a 5.0 mA pulse, 0.5 seconds after pulse completion wherein curve 44 was constructed from the 0.02 seconds pulse length, curve 46 was constructed from the 0.2 seconds pulse length and curve 48 was constructed from the 2.0 seconds pulse length.

Figure 6:
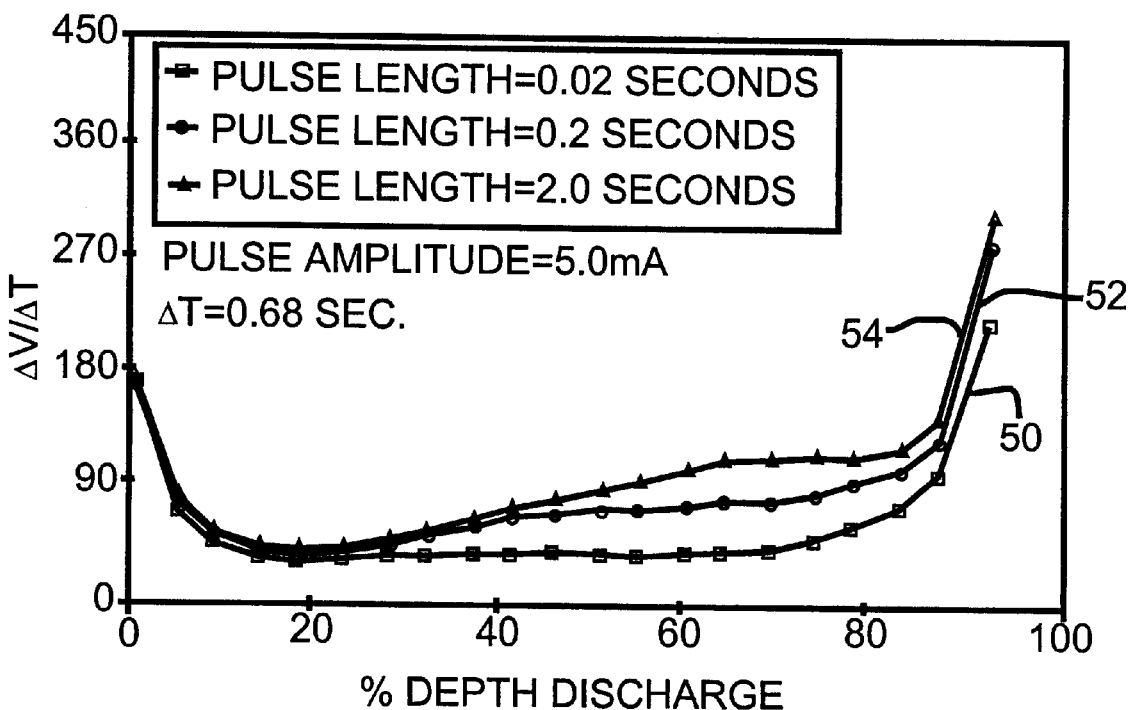

In FIG. 6, all of the curves were constructed from voltage recovery under a 5.0 mA pulse, 0.68 seconds after pulse completion wherein curve 50 was constructed from the 0.02 seconds pulse length, curve 52 was constructed from the 0.2 seconds pulse length and curve 54 was constructed from the 2.0 seconds pulse length.

Figure 7:
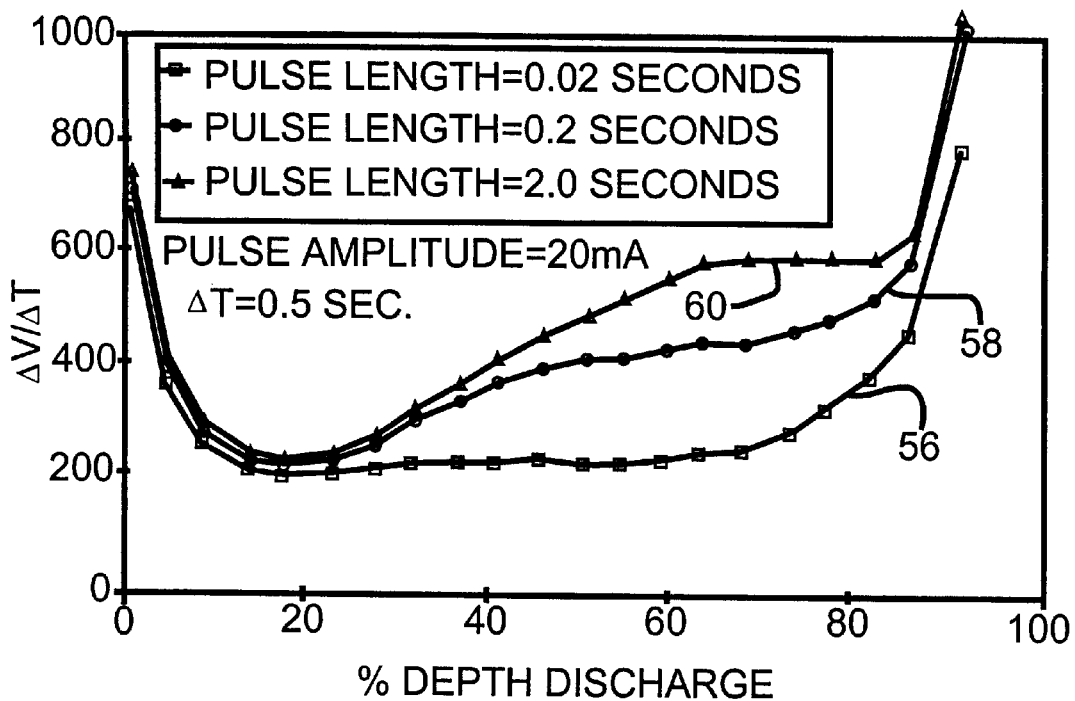

In FIG. 7, all of the curves were constructed from voltage recovery under a 20 mA pulse, 0.5 seconds after pulse completion wherein curve 56 was constructed from the 0.02 seconds pulse length, curve 58 was constructed from the 0.2 seconds pulse length and curve 60 was constructed from the 2.0 seconds pulse length.

Figure 8:
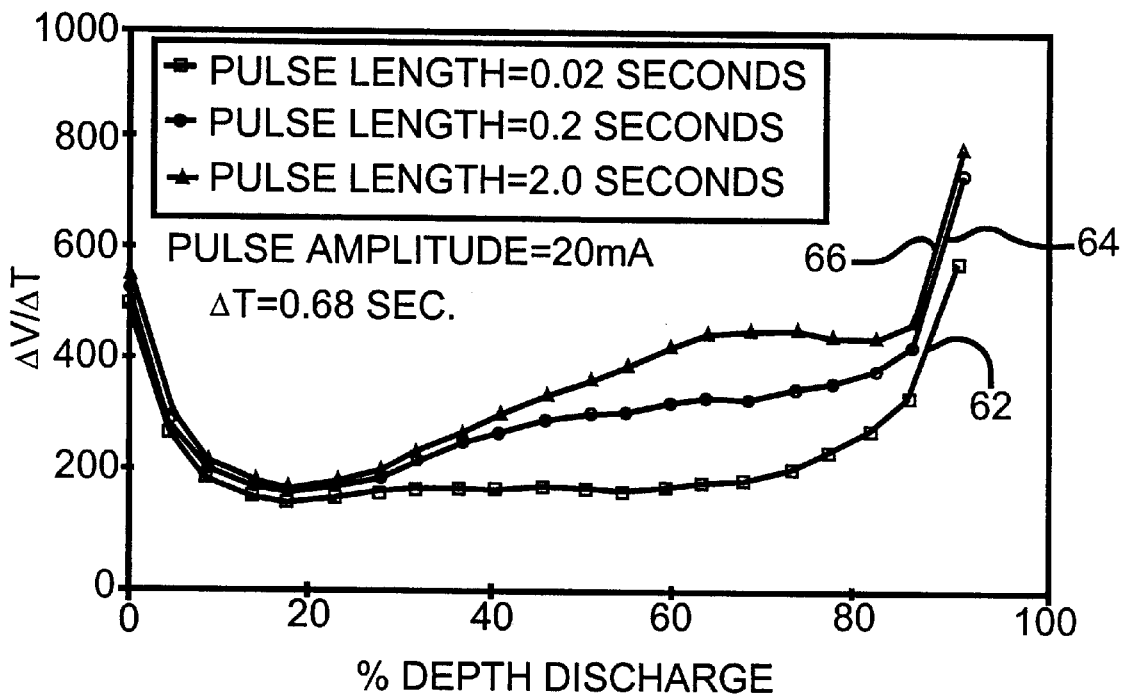

In FIG. 8, all of the curves were constructed from voltage recovery under a 20 mA pulse, 0.68 seconds after pulse completion wherein curve 62 was constructed from the 0.02 seconds pulse length, curve 64 was constructed from the 0.2 seconds pulse length and curve 66 was constructed from the 2.0 seconds pulse length.

The requirement in this example that the pulse length (T2−T1) and recovery time (T3−T2) must be less than 0.83 seconds excludes from consideration those pulses having a 2 second pulse length, namely, curves 36, 42, 48, 54, 60 and 66, as well as those pulses having a 0.2 second pulse length with a 0.68 second recovery, namely, curves 40, 52 and 64.

The fuel gauge methodology used in this example assumes recording $\Delta V/\Delta T$ at least once every 5% to 10% DOD (computed), where:

% Depth of Discharge=[(delivered capacity/theoretical capacity)*100].

The methodology steps to determine DOD when using a 0.5 mA or 5 mA pulse are as follows:

1. Apply the pulse for the appropriate seconds; record V1 and T2.
2. Allow 0.5 or 0.68 seconds for recovery; record V2 and T3.
3. Compute $\Delta V/\Delta T=(V2-V1)/(T3-T2)$.
4. Perform a trend analysis of $\Delta V/\Delta T$ as a function of DOD using a minimum of three points.
5. Compare against FIGS. 3 and 4 (for a 0.5 mA pulse) or FIGS. 5 and 6 (for a 5 mA pulse).

6. Evaluation:
   If the trend is negative (decreasing), the cell is in the initial stage of its life (DOD<25%).
   If the trend is near zero (flat), the cell is in the middle-of-life area (25%<DOD<50%).
   If the trend is positive (increasing), the cell is in the latter stage of its life (DOD>50%). At this point, $\Delta V/\Delta T$ monitoring should be coupled with discharge voltage monitoring.

This methodology, appropriate for 0.5 mA and 5.0 mA pulse amplitudes, must be modified to allow for use of a 20 mA pulse. Therefore, the methodology steps to determine DOD using a 20 mA pulse are as follows:

1. Apply the pulse for the appropriate seconds; record V1 and T2.
2. Allow 0.5 or 0.68 seconds for recovery; record V2 and T3.
3. Compute $\Delta V/\Delta T=(V2-V1)/(T3-T2)$.
4. Perform a trend analysis of $\Delta V/\Delta T$ as a function of DOD using a minimum of three points.
5. Compare against FIGS. 7 and 8.
6. Evaluation:
   If the trend is negative (decreasing), the cell is in the initial stage of its life (DOD<20%).
   If the trend is near zero (flat) and the pulse length=0.02 seconds, the cell is in its middle-of-life area (20%<DOD<60%) or, if the pulse length=0.2 seconds, the cell is in a transition area (18%<DOD<23%).
   If the trend is positive (increasing) and the pulse length=0.02 seconds, the cell is in the latter stage of its life (DOD>60%) or, if the pulse length=0.2 seconds, the cell is beyond the transition stage of its life (DOD>25%). Since $(\Delta V/\Delta T)$ is nearly monotonic, DOD may be read directly from FIGS. 7 and 8. When the trend is positive, $\Delta V/\Delta T$ monitoring should be coupled with discharge voltage monitoring.

Thus, the present invention describes a method for determining the remaining discharge capacity in an alkali metal cell powering an electronic device such as an implantable medical device. While the example is directed to Li/CF$_x$ cells, the method for determining the remaining discharge capacity according to the present invention is believed to be applicable to all pulse dischargeable alkali metal/solid cathode cells. Exemplary electrochemical couples include Li/SVO, Li/CSVO and Li/MnO$_2$ as well as lithium and the other cathode active materials described hereinabove. Such a "fuel gauge" is useful for determining and planning elective surgery when the power source for the medical device is approaching its end-of-life and needs to be replaced.

It is appreciated that various modifications to the inventive concepts described herein may be apparent to those of ordinary skill in the art without departing from the spirit and scope of the present invention as defined by the appended claims.

What is claimed is:

1. In combination with an implantable medical device requiring a substantially constant discharge rate during a medical device monitoring function and at least one pulse discharge for a medical device operating function, the combination comprising:
   a) an electrochemical cell comprising an alkali metal anode and a solid cathode activated with a nonaqueous electrolyte, wherein the cell has a determinable stoichiometric capacity;
   b) electronic circuitry powered by the electrochemical cell for discharging the cell under a first load condition and at a second, lighter load or at an open circuit voltage condition, wherein the first load occurs during a medical device operating mode for charging a capacitor or delivering therapy and the second load occurs during a medical device monitoring mode;
   c) wherein the electronic circuitry provides for determining the remaining discharge capacity in the cell by having the first load condition removed from the cell at a first time so that the cell's discharge voltage relaxes from a first voltage at the first load to a second voltage at a second, lighter load or at an open circuit voltage condition and measuring the voltage change from the first voltage to the second voltage, wherein the time interval for the cell to relax from the first voltage at the first time to the second voltage at the second time is measurable and wherein the voltage change is divisible by the time interval to determine a $\Delta V/\Delta T$ ratio and wherein the calculation of the $\Delta V/\Delta T$ ratio is repeated for at least two additional times to obtain at least three $\Delta V/\Delta T$ ratios; and
   d) wherein the $\Delta V/\Delta T$ ratios are comparable to perform an analysis on the slope of the resulting curve to thereby determine the discharge capacity remaining in the cell.

2. The combination of claim 1 wherein in the trend analysis of the slope of the resulting curve, if the pulse amplitude is less than or equal to about 5 mA and the time interval is less than about 0.68 seconds, then:
   i) if the slope of the curve is negative or decreasing, the cell is in the initial stage of its life and its depth-of-discharge is less than about 25%;
   ii) if the slope of the curve is substantially zero, the cell is in the middle-of-life stage and its depth-of-discharge is greater than about 25%, but less than about 50%; and
   iii) if the slope of the curve is positive or increasing, the cell is in a latter stage of its life and the depth-of-discharge is greater than about 50%; and
wherein if the pulse amplitude is greater than about 5 mA and the time interval is less than about 0.68 seconds, then:
   i) if the slope of the curve is negative or decreasing, the cell is in the initial stage of its life and its depth-of-discharge is less than about 20%;
   ii) if the slope of the curve is substantially zero, and the pulse length is about 0.02 seconds, the cell is in the middle-of-life stage and its depth-of-discharge is greater than about 20%, but less than about 60%, or if the pulse length is about 0.2 seconds, the depth-of-discharge is greater than about 18%, but less than about 23%; and
   iii) if the slope of the discharge curve is positive or increasing, and the pulse length is about 0.02 seconds, the cell is in the latter stage of its life and the depth-of-discharge is greater than about 60%, or if the pulse length is about 0.2 seconds, the depth-of-discharge is greater than about 25%.

3. The combination of claim 1 wherein the solid cathode comprises fluorinated carbon as an active material.

4. The combination of claim 1 wherein the solid cathode is selected from the group consisting of silver vanadium oxide, copper silver vanadium oxide, manganese dioxide, cobalt oxide, nickel oxide, fluorinated carbon, copper oxide, copper sulfide, iron sulfide, iron disulfide, titanium disulfide and copper vanadium oxide, and mixtures thereof.

5. The combination of claim 1 wherein the cathode comprises from about 80 to about 99 weight percent of a cathode active material.

6. The combination of claim 1 wherein the cathode further comprises a binder material and a conductive additive.

7. The combination of claim 6 wherein the binder material is a fluoro-resin powder.

8. The combination of claim 6 wherein the conductive additive is selected from the group consisting of carbon, graphite powder, acetylene black and metallic powder selected from the group consisting of titanium, aluminum, nickel and stainless steel, and mixtures thereof.

9. The combination of claim 1 wherein the cathode comprises from about 0 to 3 weight percent carbon, about 1 to 5 weight percent of a powder fluoro-resin and about 94 weight percent of the cathode active material.

10. The combination of claim 1 wherein the cell is activated with the nonaqueous electrolyte having an inorganic salt dissolved therein, wherein the alkali metal of the salt is the same as the alkali metal comprising the anode.

11. The combination of claim 10 wherein the nonaqueous solvent from the group consisting of tetrahydrofuran, methyl acetate, diglyme, triglyme, tetraglyme, 1,2-dimethoxyethane, 1,2-diethoxyethane, 1-ethoxy, 2-methoxyethane, dimethyl carbonate, diethyl carbonate, dipropyl carbonate, ethyl methyl carbonate, methyl propyl carbonate, ethyl propyl carbonate, propylene carbonate, ethylene carbonate, butylene carbonate, acetonitrile, dimethyl sulfoxide, dimethyl formamide, dimethyl acetamide, γ-valerolactone, γ-butyrolactone and N-methyl-pyrrolidinone, and mixtures thereof.

12. The combination of claim 10 wherein the alkali metal salt is selected from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, LISCN, $LiO_2$, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof.

13. The combination of claim 1 wherein the cell has a lithium anode active material in electrical contact with a nickel current collector and the cathode comprises fluorinated carbon active material in electrical contact with a titanium current collector and wherein the anode and the cathode are activated with the electrolyte solution comprising 1.0M $LiBF_4$ in γ-butyrolactone.

14. A method for determining the remaining discharge capacity in an electrochemical cell, comprising the steps of:
 a) providing the electrochemical cell comprising an alkali metal anode and a solid cathode activated with a nonaqueous electrolyte;
 b) determining a stoichiometric capacity of the cell;
 c) discharging the cell under a first load condition;
 d) removing the first load from the cell at a first time so that the cell's discharge voltage relaxes from a first voltage at the first load to a second voltage at a second, lighter load or an open circuit voltage condition and measuring the voltage change from the first voltage to the second voltage;
 e) measuring the time interval for the cell to relax from the first voltage at the first time to the second voltage at the second time;
 f) dividing the voltage change by the time interval to determine a $\Delta V/\Delta T$ ratio;
 g) repeating steps c) through f) for at least two additional times to obtain at least three $\Delta V/\Delta T$ ratios;
 h) comparing the $\Delta V/\Delta T$ ratios; and
 i) performing an analysis on the slope of the resulting curve to thereby determine the discharge capacity remaining in the cell.

15. The method for claim 14 including performing the trend analysis of the slope of the resulting curve, wherein if the pulse amplitude is less than or equal to about 5 mA and the time interval is less than about 0.68 seconds, comprising the steps of:
 i) if the slope of the curve is negative or decreasing, the cell is in the initial stage of its life and its depth-of-discharge is less than about 25%;
 ii) if the slope of the curve is substantially zero, the cell is in the middle-of-life stage and its depth-of-discharge is greater than about 25%, but less than about 50%; and
 iii) if the slope of the curve is positive or increasing, the cell is in a latter stage of its life and the depth-of-discharge is greater than about 50%; and
wherein if the pulse amplitude is greater than about 5 mA and the time interval is less than about 0.68 seconds, the trend analysis comprising the steps of:
 i) if the slope of the curve is negative or decreasing, the cell is in the initial stage of its life and its depth-of-discharge is less than about 20%;
 ii) if the slope of the curve is substantially zero, and the pulse length is about 0.02 seconds, the cell is in the middle-of-life stage and its depth-of-discharge is greater than about 20%, but less than about 60%, or if the pulse length is about 0.2 seconds, the depth-of-discharge is greater than about 18%, but less than about 23%; and
 iii) if the slope of the discharge curve is positive or increasing, and the pulse length is about 0.02 seconds, the cell is in the latter stage of its life and the depth-of-discharge is greater than about 60%, or if the pulse length is about 0.2 seconds, the depth-of-discharge is greater than about 25%.

16. The method of claim 14 including providing the solid cathode having fluorinated carbon as an active material.

17. The method of claim 14 including selecting the solid cathode from the group consisting of silver vanadium oxide, copper silver vanadium oxide, manganese dioxide, cobalt oxide, nickel oxide, fluorinated carbon, copper oxide, copper sulfide, iron sulfide, iron disulfide, titanium disulfide and copper vanadium oxide, and mixtures thereof.

18. The method of claim 14 including providing the cathode comprising from about 80 to about 99 weight percent of a cathode active material.

19. The method of claim 14 including providing the cathode further comprising a binder material and a conductive additive.

20. The method of claim 19 wherein the binder material is a fluoro-resin powder.

21. The method of claim 19 including selecting the conductive additive from the group consisting of carbon, graphite powder, acetylene black and metallic powder selected from the group consisting of titanium, aluminum, nickel and stainless steel, and mixtures thereof.

22. The method of claim 14 wherein the cathode comprises from about 0 to 3 weight percent carbon, about 1 to 5 weight percent of a powder fluoro-resin and about 94 weight percent of the cathode active material.

23. The method of claim 14 including activating the cell with the nonaqueous electrolyte having an inorganic salt dissolved therein, wherein the alkali metal of the salt is the same as the alkali metal comprising the anode.

24. The method of claim 23 including selecting the nonaqueous solvent from the group consisting of tetrahydrofuran, methyl acetate, diglyme, triglyme, tetraglyme, 1,2-dimethoxyethane, 1,2-diethoxyethane, 1-ethoxy, 2-methoxyethane, dimethyl carbonate, diethyl carbonate, dipropyl carbonate, ethyl methyl carbonate, methyl propyl carbonate, ethyl propyl carbonate, propylene carbonate, ethylene carbonate, butylene carbonate, acetonitrile, dimethyl sulfoxide, dimethyl formamide, dimethyl acetamide, γ-valerolactone, γ-butyrolactone and N-methyl-pyrrolidinone, and mixtures thereof.

25. The method of claim 23 including selecting the alkali metal salt from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, LiSCN, $LiO_2$, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof.

26. The method of claim 14 including providing the cell having lithium anode active material in electrical contact with a nickel current collector and the cathode comprising fluorinated carbon active material in electrical contact with a titanium current collector and wherein the anode and the cathode are activated with the electrolyte solution comprising 1.0M $LiBF_4$ in γ-butyrolactone.

27. The method of claim 14 including providing the cell powering an implantable medical device.

28. A method for determining the remaining discharge capacity in an electrochemical cell, comprising the steps of:
    a) providing an electronic device powered by the electrochemical cell;
    b) providing the electrochemical cell comprising an alkali metal anode and a solid cathode activated with a nonaqueous electrolyte;
    c) determining a stoichiometric capacity of the cell;
    d) discharging the cell under a first load condition;
    e) removing the first load from the cell at a first time so that the cell's discharge voltage relaxes from a first voltage at the first load to a second voltage at a second, lighter load or an open circuit voltage condition and measuring the voltage change from the first voltage to the second voltage;
    f) measuring the time interval for the cell to relax from the first voltage at the first time to the second voltage at the second time;
    g) dividing the voltage change by the time interval to determine a $\Delta V/\Delta T$ ratio;
    h) repeating steps d) through g) for at least two additional times to obtain at least three $\Delta V/\Delta T$ ratios;
    i) comparing the $\Delta V/\Delta T$ ratios; and
    j) performing an analysis on the slope of the resulting curve to thereby determine the discharge capacity remaining in the cell powering the electronic device.

29. The method of claim 28 including performing the trend analysis of the slope of the resulting curve, wherein if the pulse amplitude is less than or equal to about 5 mA and the time interval is less than about 0.68 seconds, comprising the steps of:
    i) if the slope of the curve is negative or decreasing, the cell is in the initial stage of its life and its depth-of-discharge is less than about 25%;
    ii) if the slope of the curve is substantially zero, the cell is in the middle-of-life stage and its depth-of-discharge is greater than about 25%, but less than about 50%; and
    iii) if the slope of the curve is positive or increasing, the cell is in a latter stage of its life and the depth-of-discharge is greater than about 50%; and
wherein if the pulse amplitude is greater than about 5 mA and the time interval is less than about 0.68 seconds, the trend analysis comprising the steps of:
    i) if the slope of the curve is negative or decreasing, the cell is in the initial stage of its life and its depth-of-discharge is less than about 20%;
    ii) if the slope of the curve is substantially zero, and the pulse length is about 0.02 seconds, the cell is in the middle-of-life stage and its depth-of-discharge is greater than about 20%, but less than about 60%, or if the pulse length is about 0.2 seconds, the depth-of-discharge is greater than about 18%, but less than about 23%; and
    iii) if the slope of the discharge curve is positive or increasing, and the pulse length is about 0.02 seconds, the cell is in the latter stage of its life and the depth-of-discharge is greater than about 60%, or if the pulse length is about 0.2 seconds, the depth-of-discharge is greater than about 25%.

* * * * *